United States Patent [19]
Hyde et al.

[11] Patent Number: 5,193,262
[45] Date of Patent: Mar. 16, 1993

[54] METHOD FOR FORMING A FUEL TANK ASSEMBLY

[75] Inventors: James P. Hyde, Saline; Thomas J. Bryans, Plymouth, both of Mich.

[73] Assignee: Ford Motor Company, Dearborn, Mich.

[21] Appl. No.: 765,637

[22] Filed: Sep. 25, 1991

Related U.S. Application Data

[62] Division of Ser. No. 516,002, Apr. 16, 1990, Pat. No. 5,067,575.

[51] Int. Cl.⁵ .............................................. B23P 11/02
[52] U.S. Cl. ........................................... 29/447; 29/434; 29/439; 29/441.1; 29/525.1; 264/342 R; 264/230; 220/562; 220/746
[58] Field of Search .................. 29/447, 434, 437, 439, 29/441.1, 453, 455.1, 525.1; 264/342, 230; 220/85 R

[56] References Cited

U.S. PATENT DOCUMENTS

| | | | |
|---|---|---|---|
| 3,330,518 | 7/1967 | Adler | 248/223 |
| 3,742,995 | 7/1973 | Confer et al. | 264/274 |
| 3,778,958 | 12/1973 | Fowler | 52/760 |
| 3,945,544 | 3/1976 | Walker et al. | 224/32 |
| 4,021,973 | 5/1977 | Hegg et al. | 52/36 |
| 4,127,353 | 11/1978 | Busse | 403/245 |
| 4,203,611 | 5/1980 | Makela | 280/163 |
| 4,353,663 | 10/1982 | Glickman | 403/230 |
| 4,505,611 | 3/1985 | Nagashima et al. | 403/406 |
| 4,634,309 | 1/1987 | Dewey | 403/407.1 |
| 4,681,476 | 7/1987 | Mischenko | 403/42 |
| 4,688,961 | 8/1987 | Shioda et al. | 403/389 |
| 4,712,637 | 12/1987 | Mogi et al. | 180/219 |
| 4,717,163 | 1/1988 | Tsukiji | 280/833 |
| 4,877,147 | 10/1989 | Hyde | 220/746 |
| 4,895,268 | 1/1990 | Hyde | 220/675 |
| 4,909,530 | 3/1990 | Tsukada et al. | 180/69.1 |

Primary Examiner—Timothy V. Eley
Assistant Examiner—David P. Bryant
Attorney, Agent, or Firm—Clifford L. Sadler; Damian Porcari

[57] ABSTRACT

A heat shield retainer and method for mounting a heat shield onto a polymeric fuel tank. The heat shield retainer comprises a nut and bolt combination and a retainer body. The retainer body has bulbous pegs located on a first side thereof for engaging within corresponding sockets located within a fuel tank to secure the retainer body to the fuel tank. The retainer body further includes a releasable channel located on a second side thereof for releasably connecting the nut and bolt thereto. One or more retainers of the present invention may be employed to mount a heat shield onto a polymeric fuel tank. After a polymeric tank has been formed, and before it has cooled, the respective pegs of each heat shield retainer are inserted into corresponding sockets located within the fuel tank. As the tank cools, the polymeric material of the tank defining the sockets contracts about the pegs. As a result, after the tank cools, the pegs are locked within the sockets, and hence to the fuel tank.

12 Claims, 3 Drawing Sheets

METHOD FOR FORMING A FUEL TANK ASSEMBLY

This is a division of application Ser. No. 07/516,002 filed Apr. 16, 1990, now U.S. Pat. No. 5,067,575.

BACKGROUND OF THE INVENTION

The present invention generally relates to a retainer for connecting two members together and, more particularly, to a heat shield retainer for connecting a heat shield to a fuel tank.

It is known in the prior art to use fuel tanks made from polymeric materials, such as polyethylene, in motor vehicles. Such fuel tanks are advantageous because they resist corrosion and can be easily formed having various shapes and sizes, thus permitting flexibility in their design. Further, since polymeric fuel tanks are light weight, they make the vehicles in which they are employed more fuel efficient and economical to operate.

Heat shields have been in used in the past in combination with polymeric fuel tanks. The heat shields serve to reflect a harmful portion of the heat emitted from the exhaust system away from the fuel tanks. The heat shields are normally mounted to the fuel tanks a spaced distance therefrom by heat shield retainers. Air contained within the spaced distance between the heat shield and the fuel tank acts as an insulator for the fuel tank.

Heat shield retainers for mounting a heat shield to a polymeric fuel tank have, in the past, been welded onto the polymeric fuel tanks in order to be connected thereto. Welding heat shield retainers onto fuel tanks, however, has been found to be inefficient and tedious. This is because, in order to connect a heat shield retainer to a polymeric fuel tank, an operator must proceed through a time consuming welding process.

Accordingly, a need exists for an improved heat shield retainer whereby a simplified method may be employed for connecting the same to a plastic fuel tank.

SUMMARY OF THE INVENTION

This need is met by the present invention which employs a heat shield retainer having pegs thereon in order to mount a heat shield onto a fuel tank. The heat shield retainer is connected to the fuel tank by the pegs which are lockingly engaged within sockets in the fuel tank. Thus, the heat shield retainer of the present invention may be secured to a fuel tank without being welded thereto.

The heat shield retainer of the present invention comprises a nut and bolt combination and a retainer body. The retainer body has pegs located on a first side thereof for engaging within corresponding sockets formed into the outer surface of a fuel tank to secure the retainer body to the fuel tank. The retainer body further includes a releasable channel located on a second side thereof for releasably connecting the nut and bolt thereto.

One or more retainers of the present invention may be employed to mount a heat shield onto a polymeric fuel tank. After a polymeric tank has been formed, and before it has cooled, the respective pegs of each heat shield retainer are inserted into corresponding sockets formed in the outer surface of the fuel tank. As the tank cools, the polymeric material defining the sockets contracts about the pegs. As a result, after the tank cools, the pegs are locked within the sockets, and hence to the fuel tank.

In accordance with one aspect of the present invention, a fuel tank/heat shield assembly comprises a fuel tank, a heat shield for shielding the fuel tank, and retainer means for mounting the heat shield to the fuel tank. The retainer means includes a retainer body having a first side and a second side, with peg fastening means located on the first side of the retainer body for securing the retainer body to the fuel tank. Attachment means are located on the second side of the retainer body for attaching the heat shield to the retainer body. The fuel tank includes socket means for receiving and lockingly engaging the peg fastening means therein to secure the retainer body to the fuel tank. The retainer body and the peg fastening means may be integrally formed as a single unit from a polymeric material. The peg fastening means on the retainer body may comprise one or more bulbous pegs received by the socket means.

The retainer body preferably includes a releasable channel means on the second side thereof for releasably connecting the attachment means to the retainer body. The attachment means may comprises a bolt and nut combination which is releasably connected to the second side of the retainer body by engagement with the channel means. The bolt comprises a main body section having a head thereon and the releasable channel means receives the head and a portion of the main body section of the bolt. The releasable channel means includes a recess defined by a wall in the retainer body. A portion of the wall has an arcuate shape defining a substantially semicircular opening of substantially the same diameter as the main body section of the bolt. The wall further has rounded surfaces spaced apart a distance slightly narrower than the main body section of the bolt to form a constriction at the entrance of the semicircular opening to releasably capture the main body section of the bolt.

The heat shield protects the fuel tank from a harmful amount of heat generated by a motor vehicle by reflecting heat which would otherwise be applied to the tank. The heat shield is mounted to the fuel tank a spaced distance therefrom. The distance is defined by the retainer means and permits air contained therein to act as an insulator for the fuel tank. The heat shield is preferably made from a metallic material.

In accordance with another aspect of the present invention, a fuel tank/heat shield assembly for a motor vehicle comprises a fuel tank, a heat shield for shielding the fuel tank, and retainer means for mounting the heat shield to the fuel tank. The retainer means includes a retainer body having a first side and a second side. Fastener means are located on the first side of the retainer body for connecting the retainer body to the fuel tank. A bolt and nut are releasably connected to the retainer body on the second side thereof for releasably connecting the heat shield to the fuel tank. Releasable channel means are located on the second side of the retainer body for releasably connecting the bolt and nut to the retainer body.

The bolt comprises a main body section having a head thereon and the releasable channel means receives the head and a portion of the main body section of the bolt. The releasable channel means includes a recess defined by a wall in the retainer body. A portion of the wall has an arcuate shape defining a substantially semicircular opening of substantially the same diameter as the main body section of the bolt. The wall further has rounded surfaces spaced apart a distance slightly narrower than the main body section of the bolt to form a constriction at the entrance of the semicircular opening to releasably capture the main body section of the bolt. The fastener means may comprise one or more bulbous pegs capable of fitting into the same number of sockets in the fuel tank.

In accordance with a further aspect of the present invention, a retainer for connecting a heat shield to a fuel tank comprises a retainer body having a first side and a second side. Fastener means are located on the first side of the retainer body for connecting the retainer body to a fuel tank and a bolt and nut are releasably connected to the retainer body on the second side thereof for releasably connecting a heat shield to the fuel tank. Releasable channel means located on the second side of the retainer body provide for releasably connecting the bolt and nut to the retainer body. The bolt comprises a main body section having a head thereon and the releasable channel means receives the head and a portion of the main body section of the bolt. The releasable channel means includes a recess defined by a wall in the retainer body. A portion of the wall has an arcuate shape defining a substantially semicircular opening of substantially the same diameter as the main body section of the bolt. The wall further has rounded surfaces spaced apart a distance slightly narrower than the main body section of the bolt to form a constriction at the entrance of the semicircular opening to releasably capture the main body section of the bolt. The fastener means may comprise one or more bulbous pegs capable of fitting into the same number of sockets in the fuel tank.

In accordance with still another aspect of the present invention, a method for forming a fuel tank/heat shield assembly comprises the steps of: forming a fuel tank having at least one socket therein from heated polymeric material; providing a heat shield; providing retainer means for connecting the heat shield to the fuel tank, the retainer means including a retainer body having peg fastening means on a first side thereon for connecting the retainer body to the fuel tank; connecting the retainer body to the fuel tank by inserting the peg fastening means into the at least one socket in the fuel tank after the tank has been formed and before the tank has cooled in order to permit the socket means to contract about the peg fastening means as the tank cools; and, attaching the heat shield to the retainer body.

The retainer means further includes a channel located on a second side of the retainer body and a nut and bolt combination. The step of attaching the heat shield to the retainer body comprises the steps of: snap-fitting the bolt in the channel located in the retainer body, placing the heat shield on the retainer body and fastening the heat shield onto the retainer body by threadedly engaging and tightening the nut on the bolt.

According to preferred embodiments of the present invention, it is an object to provide an improved heat shield retainer whereby a simplified method may be employed for connecting the same to a plastic fuel tank. This and other objects and advantages of the present invention will be apparent from the following description, the accompanying and the appended claims.

DETAILED DESCRIPTION OF THE PREFERRED EMBODIMENT

Figure 1:
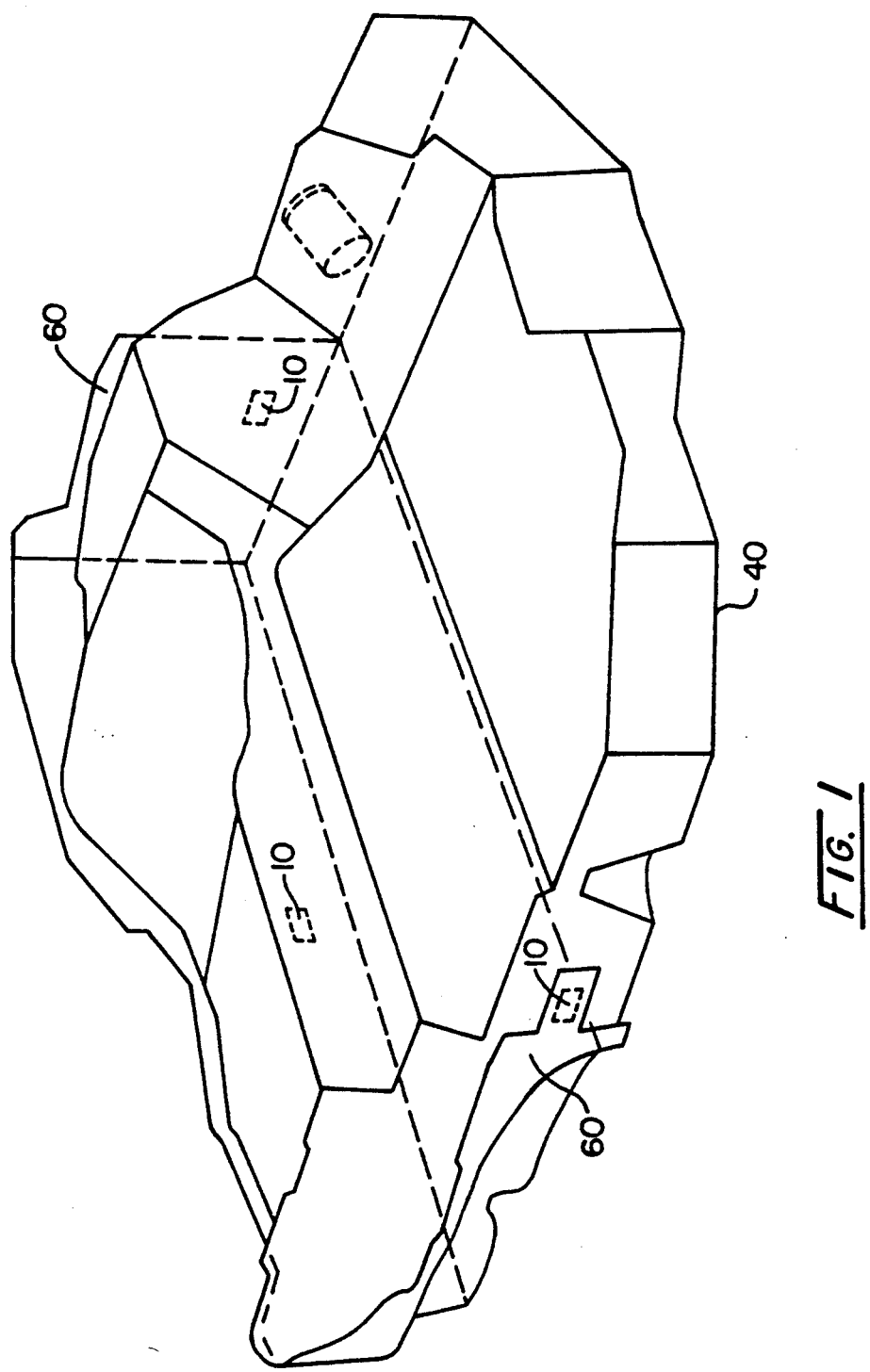
FIG. 1 is a schematic perspective view of a fuel tank having a heat shield mounted thereto in accordance with the method and apparatus of the present invention.

Referring to FIG. 1, the retainer 10 of the present invention is schematically shown at three locations about a fuel tank 40 for mounting a heat shield 60 to the fuel tank 40. The fuel tank 40 is preferably made from a polymeric material, such as polyethylene. The heat shield 60 is employed to protect the polymeric fuel tank 40 from harmful amounts of heat generated by an exhaust system on a motor vehicle (not shown). The heat shield 60 is preferably made from a metallic material, such as aluminized steel, so that it may reflect a harmful portion of the heat emitted from the exhaust system away from the fuel tank 40.

The heat shield 60 is mounted a spaced distance defined by the retainers 10 from the fuel tank 40. The air contained within the spaced distance between the heat shield 60 and the fuel tank 40 acts as an insulator for the fuel tank 40.

Figure 2:
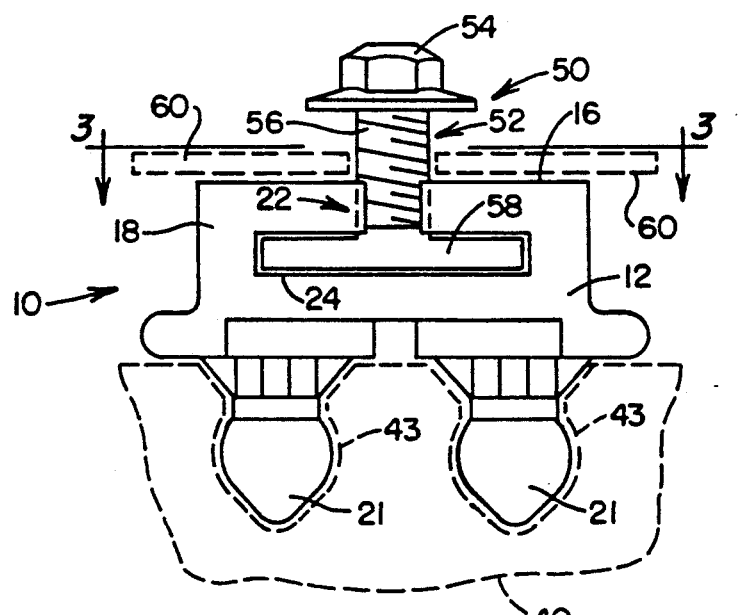
FIG. 2 is a frontal view of a heat shield retainer of the present invention.
Figure 4:
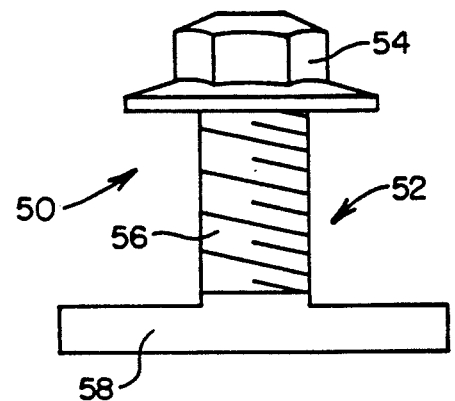
FIG. 4 is a side view of the nut and bolt combination of the heat shield retainer of FIG. 2.
Figure 3:
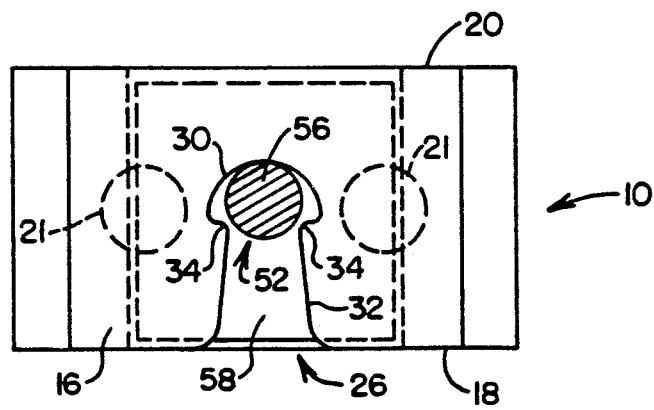
FIG. 3 is a cross-sectional view of the heat shield retainer of FIG. 2 taken along section line 3—3.

The retainer 10, as best shown in FIGS. 2 and 3, comprises attachment means 50 and a retainer body 12 which releasably receives the attachment means 50. The attachment means comprises a bolt 52 in combination with a nut 54. The bolt 52 includes a main body section 56 integrally formed with a substantially square-shaped base or head 58. The main body section 56 is externally threaded in order that the nut 54 may be threadedly engaged thereon.

Figure 5:
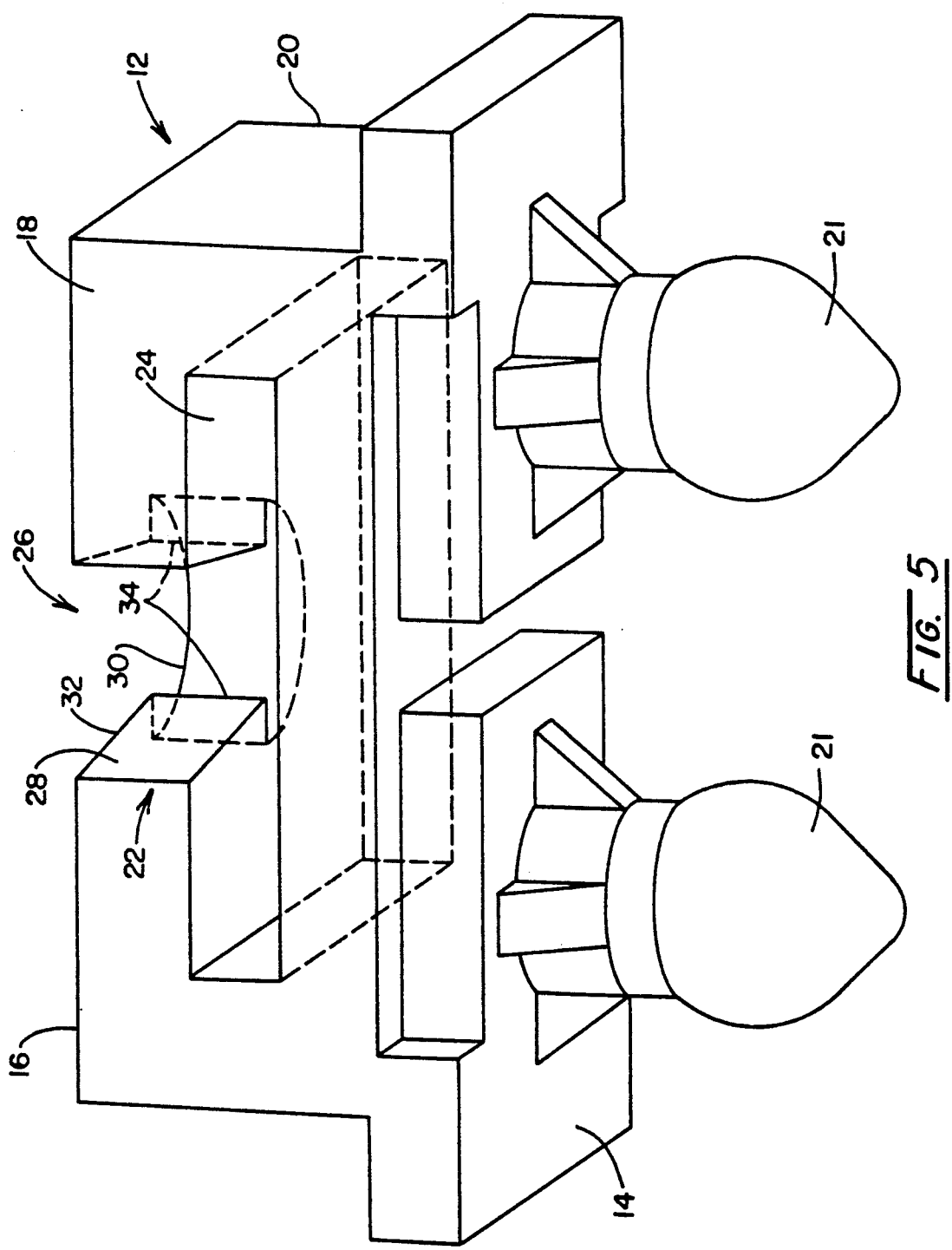
FIG. 5 is a perspective view of the retainer body of the heat shield retainer of FIG. 2.

The retainer body 12 is preferably formed from a polymeric material, such as polyethylene. The retainer body 12, as best shown in FIG. 5, has a generally rectangular shape having a lower first side 14, an upper second side 16, a front face 18 and a rear face 20. Bishops or bulbous pegs 21 are located on the first side 14 thereof for connecting the retainer body 12 onto the fuel tank 40. The bulbous pegs 21 are received within corresponding sockets 43 formed into the outer surface of the fuel tank 40, as shown in FIG. 2. The retainer body 12 further includes a releasable channel 22 generally located on the second side 16 thereof. A lower open portion 24 of the channel 22 extends through the retainer body 12, between the front face 18 and the rear face 20. The head 58 of the bolt 52 is received within the lower open portion 24 of the channel 22.

The channel 22 further includes an upper recess 26, as best shown in FIG. 5, which is defined by a wall 28 of the retainer body 12. A portion of the wall 28 has an arcuate shape defining a substantially semicircular opening 30 of the recess 26. The opening 30 has substantially the same diameter as the main body section 56 of the bolt 52. A further portion of the wall 28 defines an entrance 32 of the recess 26 which extends from the front face 18 and opens into the semicircular opening 30. The wall 28 further includes rounded surfaces 34 located between the portions of the wall 28 defining the entrance 32 and the semicircular opening 30. The rounded surfaces 34 are spaced apart a distance slightly narrower than the main body section 56 of the bolt 52 to form a constriction at the entrance of the semicircular opening 30. The constriction serves to capture the main body section 56 of the bolt 52, thereby releasably retaining the bolt 52 within the channel 22.

A method for mounting the heat shield 60 onto the polymeric fuel tank 40 by employing at least one heat shield retainer 10 will now be described. It is first noted, that it is within the skill of one working in the art to make a determination of the required number of heat shield retainers needed to mount a given heat shield having a certain shape and weight.

The retainer body 12 of each required heat shield retainer 10 is secured onto the polymeric fuel tank 40 just after the tank has been formed and before it has cooled. Each retainer body 12 is secured onto the fuel tank 40 by inserting its respective bulbous pegs 21 into corresponding sockets 43 formed within the fuel tank 40. As the tank 40 cools, the polymeric material of the fuel tank 40 defining the sockets 43 will contract around the pegs 12. As a result, after the tank cools, the pegs 21 are locked within the sockets 43, and hence to the fuel tank 40.

After the heat shield retainer bodies 12 have been mounted onto the fuel tank 40, bolts 52 are snap-fitted into the channels 22 of the retainer bodies 12. The heat shield 60 is subsequently placed on the retainer bodies 12. As the heat shield 60 is placed on the retainer bodies 12, the main body section 56 of each bolt 52 extends through a corresponding opening in the heat shield 60. Thereafter, nuts 54 are threadedly engaged and tightened onto the bolts 52, thereby securing the heat shield 60 onto the heat shield retainers 10, and hence the fuel tank 40.

Having thus described the heat shield retainer and a method for employing the same to mount a heat shield onto a fuel tank of the present invention in detail and by reference to a preferred embodiment thereof, it will be apparent that modifications and variations are possible without departing from the scope of the invention defined in the appended claims. For example, it is contemplated that one or any number of pegs could be utilized on the retainer of this invention. Further, it is contemplated that the retainer of the present invention may be employed to secure together elements other than a fuel tank and a heat shield.

What is claimed is:

1. A method for forming a fuel tank assembly comprising the steps of:
    forming a fuel tank having at least one socket therein from heated polymeric material;
    providing a heat shield;
    providing retainer means for connecting said heat shield to said fuel tank, said retainer means including a retainer body having peg fastening means on a first side thereof for connecting said retainer body to said fuel tank;
    connecting said retainer body to said fuel tank by inserting said peg fastening means into said at least one socket in said fuel tank after said tank has been formed and before said tank has cooled in order to permit said socket to contract about said peg fastening means as said tank cools; and
    attaching said heat shield to said retainer body.

2. The method for forming a fuel tank assembly as set forth in claim 1, wherein said retainer means further includes a channel located on said retainer body and a bolt and nut combination; and
    wherein said step of attaching said heat shield to said retainer body comprises the steps of:
        snap-fitting said bolt in said channel located in said retainer body;
        placing said heat shield on said retainer body; and
        fastening said heat shield onto said retainer body by threadedly engaging and tightening said nut on said bolt.

3. A method for forming a fuel tank assembly, said method comprising the steps of:
    forming a fuel tank from heated polymeric material;
    forming at least one socket in said fuel tank;
    providing retainer means for retaining an object on said fuel tank, said retainer means including a retainer body having fastening means thereon for connecting said retainer body to said fuel tank;
    connecting said retainer body to said fuel tank by inserting said fastening means into said at least one socket in said fuel tank after said tank has been formed and before said tank has cooled in order to permit said at least one socket to contract about said fastening means as said tank cools.

4. A method for forming a fuel tank assembly as set forth in claim 2, wherein said retainer body and said fastening means are formed integrally with one another.

5. A method for forming a fuel tank assembly as set forth in claim 3, further comprising the step of attaching a heat shield to said retainer body.

6. A method for forming a fuel tank assembly as set forth in claim 3, wherein said fuel tank is formed with two sockets therein.

7. A method for forming a fuel tank assembly, said method comprising the steps of:
    forming a fuel tank from heated polymeric material;
    forming at least one socket in said fuel tank;
    providing retainer means for retaining an object on said fuel tank, said retainer means including a retainer body having peg fastening means thereon for connecting said retainer body to said fuel tank;
    connecting said retainer body to said fuel tank by inserting said peg fastening means into said at least one socket in said fuel tank after said tank has been formed and before said tank has cooled in order to permit said at least one socket to contract about said peg fastening means as said tank cools.

8. A method for forming a fuel tank assembly, said method comprising the steps of:
    forming a fuel tank from heated polymeric material;
    forming at least one socket in said fuel tank;
    providing retainer means for retaining an object on said fuel tank, said retainer means including a retainer body having fastening means thereon for connecting said retainer body to said fuel tank, a channel located in said retainer body and a bolt and nut combination;
    connecting said retainer body to said fuel tank by inserting said fastening means into said at least one socket in said fuel tank;
    snap-fitting said bolt in said channel located in said retainer body;
    placing a heat shield on said retainer body; and
    fastening said heat shield onto said retainer body by threadedly engaging and tightening said nut on said bolt.

9. A method for forming a fuel tank assembly, said method comprising the steps of:
    forming a fuel tank from heated polymeric material;
    forming at least one socket in said fuel tank;
    providing retainer means for connecting an object to said fuel tank, said retainer means including a retainer body having fastening means for connecting said retainer body to said fuel tank; and connecting said retainer body to said fuel tank by inserting said fastening means into said at least one socket in said fuel tank after said tank has been formed and before said tank has cooled in order to permit said at least one socket to contract about said fastening means as said tank cools.

10. A method for forming a fuel tank assembly as set forth in claim 9, wherein said fastening means comprises peg fastening means for connecting said retainer body to said fuel tank.

11. A method for forming a fuel tank assembly as set forth in claim 9, further comprising the step of attaching a heat shield to said retainer body.

12. A method for forming a fuel tank assembly as set forth in claim 11, wherein said retainer means further includes a channel located in said retainer body and a bolt and nut combination; and wherein said step of attaching said heat shield to said retainer body comprises the steps of:

snap-fitting said bolt in said channel located in said retainer body;

placing said heat shield on said retainer body; and fastening said heat shield onto said retainer body by threadedly engaging and tightening said nut on said bolt.

* * * * *

UNITED STATES PATENT AND TRADEMARK OFFICE
CERTIFICATE OF CORRECTION

PATENT NO. : 5,193,262
DATED : March 16, 1993
INVENTOR(S) : James P. Hyde, Thomas J. Bryans It is certified that error appears in the above-identified patent and that said Letters Patent is hereby corrected as shown below:

Claim 9, column 6, lines 63-67, ", said method comprising the steps of:
      forming a fuel tank from heated polymeric material;
      forming at least one socket in said fuel tank;"

should be --comprising the steps of:
      forming a fuel tank having at least one socket therein from heated polymeric material;--

Signed and Sealed this

Thirtieth Day of November, 1993

Attest:

BRUCE LEHMAN

Attesting Officer

Commissioner of Patents and Trademarks